Sept. 16, 1930.  I. KITSÉE ET AL  1,775,938
COLOR PHOTOGRAPHY
Filed March 5, 1928
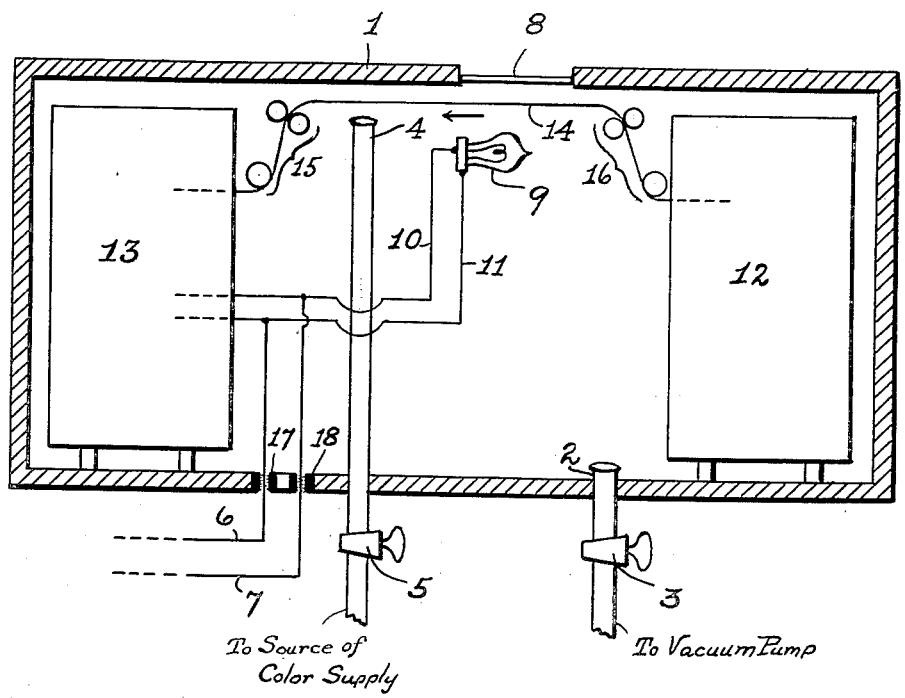
INVENTORS Patented Sept. 16, 1930

1,775,938

UNITED STATES PATENT OFFICE

ISIDOR KITSÉE AND DUFF C. LAW, OF PHILADELPHIA, PENNSYLVANIA; JANET F. LAW, ADMINISTRATRIX OF SAID DUFF C. LAW, DECEASED, ASSIGNORS TO CINEMA LABORATORYS CORPORATION, OF BROOKLYN, NEW YORK, A CORPORATION OF NEW YORK

COLOR PHOTOGRAPHY

Application filed March 5, 1928. Serial No. 259,186.

Our invention relates to an improvement in color photography and has more special reference to the method of and means for producing required figurations in desired colors on a suitable support useful for still as well as motion pictures.

It is well understood, if a photographically prepared film of celluloid, is provided with finely divided figurations, such for instance as dots, lines, or other geometric formations in one color, say for instance, orange-red, and the interstices are provided with a complementary color, say for instance blue-green, these two colors suffice for the production, in a proper photographic emulsion, subsequently applied thereto, a very satisfactory reproduction, in natural colors, of the original subject exposed thereto through said film so colored.

It is advised, however, to cover the photographic lens with a small compensating filter, this for the purpose of adjusting the necessary exposure to conform to the light used to illuminate the subject, whether natural or artificial.

If the proper emulsion is used, such for instance, as chloride or chloro-bromide, it is an easy matter to produce the desired figurations necessary for the application to the celluloid film of the first of the said complementary colors.

To produce the two complementary components (figurations) in this process, the following procedure is necessary. The photographically prepared film is first exposed as is described in Patent No. 1,383,819 issued to Isidor Kitsée. After exposure the film is developed in a solution capable of tanning or hardening the exposed portions of the thin emulsion covering the celluloid base. When the maximum tanning has been accomplished the surface of the film having thereon the developed figurations is subjected to a bath of warm water, and the unexposed and untanned parts, which form, the interstices are dissolved away clear to the surface of the celluloid without effecting in any way the hardened figurations and leaving the surface of the film at the bottom of said interstices clean of emulsion.

As the hardened photographic figurations are naturally opaque and as for our purpose they must be transparent, we have evolved a very efficient way of introducing the required color and at the same time removing all the reduced or opaque silver from these hardened photographic figurations. For imparting color to the tanned hardened gelatine figurations, we may apply to the film a methylated color dissolved in an acid solution, the acid being exemplified in lactic acid or acetic acid. The coloring agent may be pyrodine or safranine.

It is now supposed that the figurations so photographically formed are entirely transparent and have received the required coloration. At this point the interstices consist of exposed celluloid free from all emulsion. The next step is to create the complementary color in the celluloid interstices. There we encountered the greatest difficulty, residing therein, on account of the extreme minuteness of these interstices between the photographed figurations. It was impossible to color these interstices with any degree of accuracy. For a number of years we resorted to all kinds of systems, such as spraying, pressure, printing and filling, even to the extent of employing chemical, electrical and mechanical methods, but we were unable to produce a completely homogeneous result: in fact, we came to the conclusion that it was impossible to produce an accurate complementary color in these interstices and at one time abandoned all hope of over-coming this difficulty.

We at last came to the conclusion that it was first necessary to diagnose the cause of these failures, and a careful analysis convinced us that the underlying cause of the failure was a slight layer of air adhering to the celluloid proper.

To verify our conclusions we applied to a small section of film, with figurations in color and clear interstices, a suction arrangement provided with an inlet for color: to our great satisfaction the minute interstices were perfectly colored. We readily recognized that such procedure was commercially impossible, involving as it did, great expenditures of time, money and labor, not to mention the cumbersome and costly equipment, requiring weeks to prepare a single film.

Basing now, the necessary requirements on results of our experiments we have in order to obviate these difficulties and produce films for motion picture or photographic use on a commercial scale recourse to a method and means which makes it possible to color the interstices in a perfect manner in a comparatively short time: in fact, with this our new method the interstices of a film say a thousand feet in length may be perfectly colored in a few minutes at a minimum cost, far less than one cent per foot.

Broadly speaking our invention comprises the method of coloring the interstices between the photographed figurations with the aid of a reduced atmospheric pressure, and we have elected to enclose the film during the process of coloring the interstices in an air-tight housing from which all of the air is withdrawn or in which the air is highly rarefied.

The accompanying drawing illustrates in partial plan and partial sectional view one of the means adapted to be used in accordance with this our invention.

In this drawing 1 is the air-tight housing, this housing may consist of any suitable material, but should the housing consist of a metal, then the outgoing electrical conductors must be well insulated from the metal parts of the housing. 2 indicates the vacuum pump inlet, 3 indicates the valve in conventional sign, in practice this valve should be provided with automatic means so as to maintain a pre-determined degree of vacuum in housing 1. 4 indicates the inlet for the color supply, 5 is the valve therefor, illustrated also in conventional sign; 6 and 7 are two conductors reaching outside of the housing 1 and adapted to be connected to a source of current. 8 is a transparent part, preferably consisting of glass here called a window. This for the purpose of permitting inspection of the inner working of the housing 1. 9 is an electric light connected with conductors 10 and 11 which also connect with an electric device supposedly positioned in container 13. 12 and 13 are containers.

It is understood that the container 12 houses a reel carrying the film with photographic figurations and minute interstices between these photographic figurations that are to be colored. The container 13 is of course equipped with a motor, a rewinding mechanism and a reel necessary to handle the processed film. 14 indicates that part of the film issuing from container 12 passing the outlet of the color supply and entering container 13 where it is rewound. The arrow indicates the direction of progress of film 14. 15 and 16 are two series of guide rollers adapted to guide the film in its travel.

17 and 18 are insulating sleeves in close contact with housing 1 and wires 6 and 7 respectively.

As stated above, this our application refers only to the method and broadly to the means employed for carrying out our invention. But it is necessary to state here some of the rules required for the practical working of this invention.

First: The color imparted to the photographic figurations must be only water soluble dye stuff and great care must be exercised to maintain the proper density of the colored figurations.

Second: The color impregnating the interstices can only be spirit soluble dye having the proper absorptive band, such as filter green No. 2 Fabrik Werk Hoest made for additive separation, or any other suitably colored dye of the anthracene group, and the density of the color here must be regulated to make an accurate balance with the first colored photographic figurations.

Third: The speed of the film passing the means to color the interstices should be carefully regulated so as to maintain the balance between the colored photographic figurations and the interstices being colored.

Fourth: As each batch may require a slightly different period of time to imbibe the color in the interstices, because of the celluloid it is advised that the speed of feeding the film passing the color means should be determined before the mechanism inside the housing is put in operation.

Fifth: It is extremely important that the film should be free from foreign matter and more especially greasy substances.

Sixth: The exposed celluloid comprising the interstices should be made most receptive to spirit soluble dye material.

It is obvious that the housing 1 should be of sufficient dimensions to accommodate a series of films to be treated simultaneously.

If the color supply be located within the housing then suitable means to control said supply from without the housing—preferably electric means,—must be provided. We have, therefore, illustrated diagrammatically a construction wherein the supply of color material and the controlling valve therefor are outside of the casing or housing, which is sufficient for the purposes of this application.

Having now described our invention what we claim as new and desire to secure by Letters Patent is:—

1. The method of coloring the interstitial portion of a celluloid film, one side of which is provided with a developed emulsion in transparent colored figurations in relief and with minute interstices between said figurations extending to the surface of said film, which consists in removing substantially all the air from said interstices and then applying to said side of said film a liquid coloring matter dissolved in a solvent of celluloid in which the material of said emulsion is not soluble, the color of said liquid being complementary to that of said figurations.

2. The method of coloring the uncovered surface of a side of a celluloid film which is provided with a photographically developed emulsion disposed over the surface in transparent colored figurations with minute interstices between said figurations extending to the surface of said film, which consists in causing said film to travel longitudinally in a substantial vacuum and progressively applying to said film while in motion and while the air in said interstices is substantially exhausted, a liquid coloring material dissolved in a solvent of celluloid in which the material forming the figurations is not soluble, the color of said liquid being complementary to that of said figurations.

In testimony whereof we hereunto affix our signatures.

ISIDOR KITSÉE.
DUFF C. LAW.